United States Patent
Losch et al.

(10) Patent No.: US 8,613,600 B2
(45) Date of Patent: Dec. 24, 2013

(54) VACUUM PUMP SYSTEM

(75) Inventors: Wolfgang Losch, Bad Endbach (DE); André Mueller, Solms (DE)

(73) Assignee: Pfeiffer Vacuum GmbH, Asslar (DE)

( * ) Notice: Subject to any disclaimer, the term of this patent is extended or adjusted under 35 U.S.C. 154(b) by 1275 days.

(21) Appl. No.: 11/522,246

(22) Filed: Sep. 15, 2006

(65) Prior Publication Data

US 2007/0065294 A1    Mar. 22, 2007

(30) Foreign Application Priority Data

Sep. 22, 2005   (DE) .......................... 10 2005 045 283

(51) Int. Cl.
F04B 49/06 (2006.01)

(52) U.S. Cl.
USPC ....................................................... 417/44.1

(58) Field of Classification Search
USPC ............. 417/44.1, 42, 22; 318/432, 135, 119, 318/400.01, 400.07
See application file for complete search history.

(56) References Cited

U.S. PATENT DOCUMENTS

| | | | |
|---|---|---|---|
| 5,110,264 A * | 5/1992 | Murry .............................. | 417/45 |
| 5,649,893 A * | 7/1997 | Inaniwa et al. ................... | 494/9 |
| 5,770,933 A * | 6/1998 | Larson et al. ............ | 318/400.41 |
| 5,777,447 A * | 7/1998 | Okano .......................... | 318/434 |
| 6,088,508 A * | 7/2000 | Ishibashi et al. .............. | 388/800 |
| 6,184,640 B1 | 2/2001 | Kawashima | |
| 6,354,805 B1 * | 3/2002 | M.o slashed.ller ........ | 417/44.11 |
| 6,449,567 B1 * | 9/2002 | Desai et al. ..................... | 702/58 |
| 6,603,279 B2 * | 8/2003 | Moddemann ........... | 318/400.03 |
| 2002/0067148 A1 | 6/2002 | Moddemann | |
| 2004/0046519 A1 * | 3/2004 | Leonardi et al. .............. | 318/432 |
| 2005/0013710 A1 | 1/2005 | Stanzel | |

FOREIGN PATENT DOCUMENTS

| | | | | |
|---|---|---|---|---|
| DE | 4318214 A1 * | 12/1994 | ............. | F04D 19/04 |
| DE | 0215896 | 10/2003 | | |
| JP | 2004132179 A * | 4/2004 | | |

\* cited by examiner

Primary Examiner — Devon Kramer
Assistant Examiner — Amene Bayou
(74) Attorney, Agent, or Firm — Abelman, Frayne & Schwab

(57) ABSTRACT

A vacuum pump system includes a vacuum pump with a brushless, multi-phase, synchronous motor with a permanently magnetically excited rotor, and a pump type recognition element, a control unit for controlling the vacuum pump and having a drive microcontroller and a final stage, and a further microcontroller that monitors a rotational speed of the motor and turning off the final stage in case the rotational speed of the motor exceeds a maximum allowable rotational speed of the motor, and that forms part of the control unit.

5 Claims, 1 Drawing Sheet

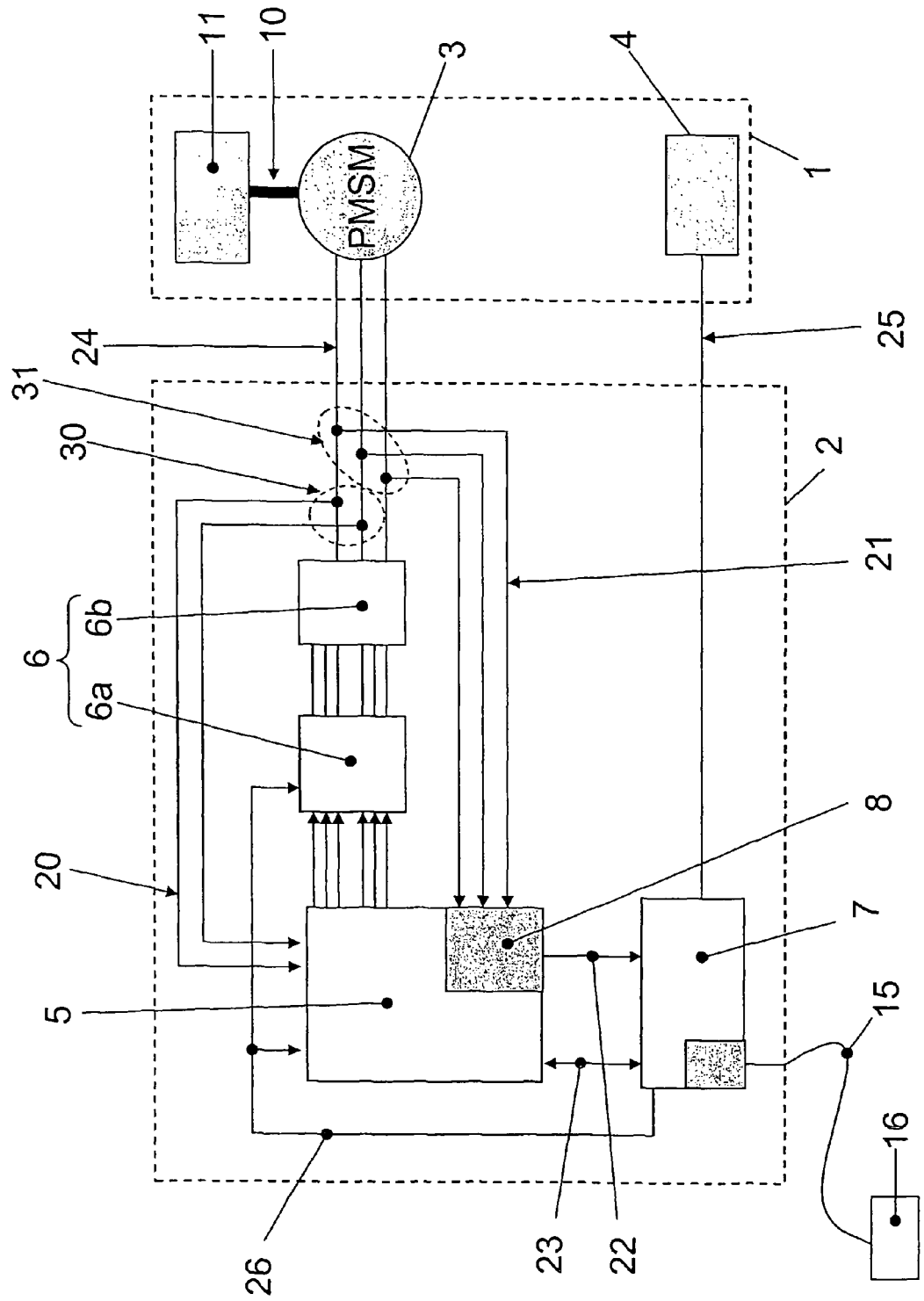

VACUUM PUMP SYSTEM

BACKGROUND OF THE INVENTION

1. Field of the Invention

The present invention relates to a vacuum pump system including a vacuum pump with brushless, multi-phase, synchronous motor with a permanently magnetically excited rotor, a control unit for controlling the vacuum pump and including a drive microcontroller and a final stage, and a further microcontroller for monitoring a rotational speed of the motor.

2. Description of the Prior Art

In the past years, brushless motors with a permanently magnetically excited rotor and a shaft having a high rotational speed, found wide application as drives for vacuum pumps. To these pumps belong, e.g., turbomolecular pumps disclosed in German Publication DE-OS 103 31 932. The danger with these pumps lies in the high energy that is stored in the rotor. If this energy is released as a result of pump malfunction, i.e., in the environment, it can cause big damages. Therefore, the housings of the vacuum pump are so formed that they can absorb a substantial amount of the releasable energy. Generally, the energy, which is stored in the rotor, depends on the rotational speed of the rotor. In order to limit the maximum stored energy, the rotational speed should be limited to a highest permissible value. This rotational speed limitation must be insured even when the control electronics of the motor itself malfunctions. The rotational speed limitation also should include protection against an excessive rotational speed.

German Publication DE-OS 102 15 896 suggests to provide in the vacuum pump, in addition to a microcontroller that directly assumes the functions of the motor electronics, a second microcontroller which, in addition to its other functions, monitors the first microcontroller. The drawback of this solution consists in that a large number of components needs to be provided on and in the vacuum pump. The arrangement of highly integrated electronic components on the pump itself might not be possible in many cases, e.g., in an environment with an intensive radiation. In addition, both microcontrollers depend for their operation on only one sensor that senses the rotation of the rotor, which limits the protection against malfunction. Furthermore, the division of the electronics between the vacuum pump and control electronics can lead to the limitation of exchangeability of the electronics and the vacuum pump, i.e., the vacuum pump and the electronics cannot be arbitrarily combined because, e.g., the functional features (e.g., the based code) of the microcontrollers should be adapted to each other. This is not user-friendly and is associated with increased costs.

Accordingly, an object of the present invention is a vacuum pump system in which arbitrary combination of a vacuum pump and control electronics is possible and a reliable overspeed protection is insured.

SUMMARY OF THE INVENTION

This and other objects of the present invention, which will become apparent hereinafter, are achieved by providing, in the vacuum pump, pump type recognition means, and by assigning to the second microcontroller the function of turning off the final stage when the rotational speed exceeds a predetermined threshold.

The inventive vacuum system proceeds from a system that includes a control unit and a vacuum pump, with the control unit including a drive microcontroller that controls a final stage and, thus, sets in rotation a brushless, multi-phase, synchronous motor with a permanently magnetically excited rotor. The drive microcontroller turns off before the threshold rotational speed is reached. According to the present invention, the second microcontroller forms part of the control unit, and the vacuum pump is provided with vacuum pump type recognition means that is evaluated by the control unit. In this way, the pump operates with a maximum allowable rotational speed. A signal proportional to the rotational speed of the rotor is communicated to the second microcontroller. When the second controller recognizes that the rotor exceeded the maximum permissible speed, it turns off the final stage that controls the motor.

The advantage of this solution consists in that only a small number of electrical and electronic components are contained in the vacuum pump itself, namely, essentially the motor and the pump type recognition means. In its simplest form, the pump type recognition means is an electrical resistor the resistance value of which varies from pump to pump. In this way, a vacuum pump can be used in an environment in which because of radiation, the electronic components are subjected to a high load. Because it is the control electronics that determines the pump type, an arbitrary combination of the vacuum pump and the control electronics is possible. Expensive repairs of the vacuum pump in case of damage of the control electronics are eliminated, the defective control electronics is replaced in its entirety. Thereby, the servicing costs are reduced. This combination ability permits to replace the entire control electronics with a new model, which was difficult in the state-of-the-art, vacuum pump system. Because the second microcontroller that monitors the rotational speed and turns off the final stage, is arranged in the control unit, a more reliable protection against the speed exceeding the maximum permissible speed is obtained.

According to an advantageous embodiment of the present invention, the second controller evaluates the pump type recognition means, which is provided in the vacuum pump, and determines the highest possible rotational speed for the vacuum pump and communicate it to the drive controller, e.g., over a serial data interface. This increase the reliability as the determination of the correct rotational speed is decoupled from the actual drive chain. It is a very effective embodiment as no additional components are necessary.

According to a further advantageous embodiment of the present invention, the drive controller determines the rotational speed of the motor from a motor model and the phase currents. This embodiment is based on the knowledge that a synchronous motor operates best at a rotational speed with which a magnetic field, which is generated by the current flow through the winding, rotates. Thereby, both the operation and the protection against an excessive speed are effected without use of sensors. Therefore, there is no need for sensors in the vacuum pump, which further reduces the number of components.

According to another embodiment, the second microcontroller determines the rotational speed from a signal generated by measurement of voltages applied to the phases. Because the rotational speed is determined from two different measurements, a separate rotational speed signal is communicated to each microcontroller, which increases the reliability of speed monitoring. Altogether, a redundant monitoring can be so formed that it is carried out through two channels, i.e., for each part of the monitoring system, there exists a second path.

According to a further development of the present invention, the measurement of the currents and voltages on phases at current and voltage measurement points, which serves for determination of the rotational speed, takes place inside the control unit. This increases the ability to arbitrary combined control units with the vacuum pumps are and insures that for operation of the vacuum pump, only the pump type recognition system and the motor needs to be provided in the vacuum pump. In addition, the number of electrical connections, which are necessary between the control unit and the vacuum pump, is reduced.

According to a further development of the present invention, the conductor through which the second controller turns off the final stage, is also connected with a corresponding input of the drive controller. Thereby, the drive controller recognizes an operational condition, which is not acceptable to it, and can undertake several controlled repeated starts.

A still further embodiment of the present invention is based on measurement of voltage in the phases. These voltages are converted by an analog-to-digital converter, which is located in a section of the drive microcontroller, to a digital signal which is evaluated by the second microcontroller. As a result, additional converter components are not necessary.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

Single FIGURE of the drawings shows a schematic simplified view of a vacuum pump system according to the present invention.

DETAILED DESCRIPTION OF THE PREFERRED EMBODIMENT

A vacuum pump system according to the present invention, which is shown in the drawing, includes a vacuum pump 1 and a control unit 2. The vacuum pump 1 has a motor 3. The motor 3 is formed as a permanent magnet synchronous motor (PMSM) and has, therefore, a rotor equipped with permanent magnets. The permanent magnets are surrounded by windings which are provided on the stator of motor 3, and generate a rotatable magnetic field. The permanent magnets, which are provided on the rotor, are magnetically coupled with the magnetic field, which is generated by the stator windings and, therefore, provide for rotation of the rotor. The rotor 10 is connected with a rotor shaft of the pumping system 11 or forms a part of the pumping system. The vacuum pump 1 has a pump type recognition means 4. The recognition system 4 is formed as an electronic component, e.g., as a memory chip. In a more simplified form and, therefore, less failure-prone, the pump type recognition means 4 can be formed as a simple electronic component, e.g., as an electrical resistor. Different pump types distinguish from each other by power consumption of the pump drive, suction capacity, and other vacuum-technical data, rotational speed, inertia torque of the rotor and so on.

The control unit 2 is connected with the pump 1 by conductors 24 and 25. These conductors 24, 25 form components of one or more cables. The control unit 2 can be flange-mounted on the vacuum pump. With a flange-mounted control unit, the conductors 24, 25 can be replaced with a plug-in contact, so that no cable is needed between the two components.

Within the control unit 2, there are arranged a drive microcontroller 5 and a final stage 6 which is formed of a final stage control 6a and a power element 6b. The drive microcontroller 5 controls the acceleration of the motor from the motor stop condition up to the motor nominal speed, and controls the speed and power of the motor. To this end, there is provided, in the drive microcontroller 5, a motor model that based on physical data, describes the rotational system (rotor, shaft, drive) and simulates it. The drive microcontroller 5 also operates based on the measure of current which is adjusted in phases. These data are stored in memory in form of tables for each pump type and are taken over by the drive controller after the determination of the pump type has been made. The data can be stored in a second microcontroller also arranged in the control unit, or be stored in a separate memory. In case of failure of voltage supply of the vacuum pump system, the drive microcontroller controls control of the generator operation of the motor for supplying power to the control electronics. The final stage 6 is formed of several stages, and, in the embodiment discussed here, of two stages used primarily for signal amplification from the lower power level of the drive microcontroller to the necessary high power level of the motor. The final stage is supplied in a per se known manner (not shown here) from a power supply with an intermediate circuit voltage.

In the embodiment discussed here, the motor is formed as a three-phase motor. The current measurement is taken on two phases and is transmitted to the drive microcontroller via the connection 20.

The result of the current measurement, together with the voltage applied to the phases, are compared in the drive microcontroller with values calculated by the motor model. If the drive microcontroller concludes, based on this comparison, that the rotational speed is greater than necessary for the pump type, the microcontroller turns the final stage off. The current measurement also serves for building up a current servo loop. The loop is necessary because the current flow in the winding determines the strength of magnetical coupling between the windings and the rotor. On one hand, the coupling should be sufficiently strong to insure a reliable rotation of the rotor also under a load and, on the other hand, the current should be limited to a maximal value.

The voltage is measured on all three phases and communicated to a converter 8 that converts an analogue voltage signal in a digital voltage signal. The converter 8 forms advantageously a part of the drive microcontroller 5. This is because in this way, the same time base is used for the conversion as for the control of the final stage. The digitalized signal is communicated to the second controller 7 via conductor 22. In case of redundant layout, the signal can be transmitted via several parallel lines. In the simplest case, this signal is a rectangular signal with a frequency that corresponds to the actual rotational speed of the motor. For better reliability, the conductor is formed as a two-channel conductor. Based on the digitalized signal, the second controller 7 determines the rotational speed, e.g., the number of rectangular pulses can be determined in a predetermined time period.

The second microcontroller 7 evaluates the pump type recognition means 4 and retrieves from its memory the highest permissible rotational speed for the recognized pump type. Advantageously, in order to provide a two-channel communication also at this point, the pump type is additionally manually input by the pump user, and both values, that communicated from the pump type recognition means 4 and that input manually, are compared. For the manual input, a keyboard 16 is used and which is connected with control electronics by cable 15. Only upon agreement of the data, the drive is released and can be started and operated.

The current and voltage measurement take place at current measurement points 30 and voltage measurement points 31 within the control unit 2. This insures a high degree of exchangeability of the control unit and the vacuum pump. Also, no conductors and/or plug-in connection should be provided through which the measurement signal could be communicated from the vacuum pump to the control unit. Essentially, for operating the drive, only conductors or plug-in connections for drive phases and the pump type recognition means are provided, which results in a noticeable cost reduction. With the motor model, it is also possible to use, in the vacuum pumps, motors supplied with a sinusoidal current, without a need to provide sensors. These motors have more uniform running characteristics than, e.g., block-commutating motors. This is because no unsteady changes of a force vector take place. Altogether, there is produced a sensorless redundant drive system.

The microcontrollers 5 and 7 are connected with each other by a serial data line. Through the data line, adjustment command and status inquiry are transmitted. In addition, the second microcontroller 7 communicates, over the data line, what maximum speed should be achieved. Also, pump-specific data, on the basis of which the motor model is developed, can be transmitted through this channel. If the second controller 7 determines that a signal of the pump speed, which is transmitted over the conductor 22, indicates a rotational speed that is above the permissible value, or that the rotational speed deviates by an impermissible value from that transmitted over the serial connection 23, it turns off the final stage 6 through the conductor 26.

According to an advantageous embodiment of the present invention, the serial connection 23 is connected with an input of the drive microcontroller so that drive microcontroller can turn off the final stage itself. Also, a predetermined and adapted to the motor condition (e.g., rotational speed) start can be determined at each rotor speed.

Vacuum pump systems are often monitored from a central location. To this end, electronic bus systems are provided. Besides, components such as, e.g., heating and cooling devices, also should be controlled. These functions also can be taken over by the second microcontroller.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A vacuum pump system, comprising a vacuum pump including a brushless, multiphase, synchronous motor with a permanently magnetically excited rotor, and pump type recognition means; and a control unit for controlling the vacuum pump and including a final stage for controlling the motor, means for determining a rotational speed of the motor, a drive microcontroller connectable with the rotational speed determining means for controlling the final stage in accordance with the rotational speed of the motor and for turning off the final stage in case the rotational speed of the motor exceeds a maximum allowable speed of the motor for a type of the vacuum pump forming part of the vacuum pump system, and a further microcontroller connectable with the pump type recognition means for determining the maximum allowable speed of the motor for the type of the pump forming part of the vacuum system and connectable with the drive microcontroller for communicating the maximum allowable speed to the drive microcontroller.

2. A vacuum pump system according to claim 1, wherein the rotational speed determining means comprises phase current measurement points connectable with the drive microcontroller, and the drive microcontroller controls acceleration of the motor from a motor stop condition to the maximum allowable speed in accordance with phase current measurements.

3. A vacuum pump system according to claim 2, further comprising conductor means for connecting the control unit with the motor, and wherein phase current measurement points are located inside the control unit.

4. A method of controlling operation of a brushless, multiphase, synchronous motor of a vacuum pump provided with pump recognition means, the method comprising the steps of providing a control unit for controlling the motor and including a final stage for controlling the motor, means for determining a rotational speed of the motor, a drive microcontroller connectable with the rotational speed determining means for controlling the final stage, and a further microcontroller connectable with the pump recognition means and the drive microcontroller; determining a maximum allowable speed of the motor for a type of the vacuum motor with the further microcontroller and communicating the maximum allowable speed to the drive microcontroller; controlling the final stage with the drive microcontroller, in accordance with the maximum allowable rotational speed; and turning off the final stage in case the rotational speed of the motor exceeds, maximum allowable rotational speed of the motor with the drive microcontroller.

5. A method according to claim 4, comprising the step of determining the rotational speed of the motor from current that flows in the phases of the motor at phase current measurement points located inside the control unit.

\* \* \* \* \*